(12) United States Patent
Theos

(10) Patent No.: US 12,169,257 B2
(45) Date of Patent: Dec. 17, 2024

(54) INDUSTRIAL VEHICLE DISTANCE AND RANGE MEASUREMENT DEVICE CALIBRATION

(71) Applicant: Crown Equipment Corporation, New Bremen, OH (US)

(72) Inventor: Sebastian Theos, Vaterstetten (DE)

(73) Assignee: Crown Equipment Corporation, New Bremen, OH (US)

( * ) Notice: Subject to any disclaimer, the term of this patent is extended or adjusted under 35 U.S.C. 154(b) by 0 days.

(21) Appl. No.: 18/477,986

(22) Filed: Sep. 29, 2023

(65) Prior Publication Data

US 2024/0019560 A1     Jan. 18, 2024

Related U.S. Application Data

(63) Continuation of application No. 17/238,353, filed on Apr. 23, 2021, now Pat. No. 11,802,948.

(60) Provisional application No. 63/014,839, filed on Apr. 24, 2020.

(51) Int. Cl.
| | |
|---|---|
| *G01S 17/06* | (2006.01) |
| *G01S 7/497* | (2006.01) |
| *G01S 17/931* | (2020.01) |

(52) U.S. Cl.
CPC ............ *G01S 7/4972* (2013.01); *G01S 17/06* (2013.01); *G01S 17/931* (2020.01)

(58) Field of Classification Search
CPC ........ G01S 17/931; G01S 17/08; G01S 17/93; G01S 7/4972; G01S 17/42; G01S 17/06; G01S 17/88; G01S 15/08; G01S 15/931; G01S 7/497; G01S 7/52004; G01S 7/4802; G01S 13/825; G01S 7/06

See application file for complete search history.

(56) References Cited

U.S. PATENT DOCUMENTS

| | | |
|---|---|---|
| 11,802,948 B2 | 10/2023 | Theos |
| 2006/0290920 A1 | 12/2006 | Kampchen et al. |
| (Continued) | | |

FOREIGN PATENT DOCUMENTS

| | | | | |
|---|---|---|---|---|
| CA | 2719953 A1 | * | 10/2009 | ............... E02F 3/435 |
| CN | 110645976 A | * | 1/2020 | ............... G01C 21/00 |
| CN | 111775957 A | * | 10/2020 | ......... B60W 50/0205 |
| (Continued) | | | | |

OTHER PUBLICATIONS

Rosner, Yvonne; International Search Report and Written Opinion of the International Searching Authority dated Aug. 9, 2021; International Application No. PCT/US2021/028758; European Patent Office; Rijswijk, Netherlands.

(Continued)

*Primary Examiner* — Michael P Stafira

(74) *Attorney, Agent, or Firm* — Stevens & Showalter LLP

(57) ABSTRACT

A process for calibrating a distance and range measurement device coupled to an industrial vehicle comprises taking a first measurement of an emission from the device at a first yaw angle relative to a roll axis of the device. A second measurement of the emission at a second yaw angle relative to the roll axis is taken. The second yaw angle is within an angular tolerance of the first yaw angle but in an opposite direction. The device is calibrated relative to the roll axis when the first and second measurements are within a tolerance of each other.

17 Claims, 9 Drawing Sheets

(56) References Cited

U.S. PATENT DOCUMENTS

2016/0011594 A1\* 1/2016 Chung ................ G06F 18/2132
  701/28
2019/0018416 A1   1/2019 Gassend

FOREIGN PATENT DOCUMENTS

| DE | 102004033114 A1 \* | 1/2006 | ........... G01S 17/023 |
| DE | 102005024875 B3 \* | 10/2006 | ............. B60T 8/172 |
| EP | 2154650 A1 \* | 2/2010 | ............. G01S 17/08 |
| EP | 2680030 A1 \* | 1/2014 | ........... G01S 7/4972 |
| EP | 3438040 A1 \* | 2/2019 | ............. B60W 30/09 |
| JP | 2019153237 A \* | 9/2019 | |
| WO | WO-2019024731 A1 \* | 2/2019 | ............. G01B 11/26 |
| WO | 2020010043 A1 | 1/2020 | |

OTHER PUBLICATIONS

Kobayashi, Miki; International Preliminary Report on Patentability dated Oct. 25, 2022; International Application No. PCT/US2021/028758; The International Bureau of WIPO; Geneva, Switzerland.
Strafira, Michael Patrick; Notice of Allowance and Fees Due dated Jun. 22, 2023; U.S. Appl. No. 17/38,353; United States Patent and Trademark Office; Alexandria, Virginia.

\* cited by examiner

INDUSTRIAL VEHICLE DISTANCE AND RANGE MEASUREMENT DEVICE CALIBRATION

CROSS REFERENCE TO RELATED APPLICATIONS

This application is a continuation of U.S. patent application Ser. No. 17/238,353, filed Apr. 23, 2021, entitled "INDUSTRIAL VEHICLE DISTANCE AND RANGE MEASUREMENT DEVICE CALIBRATION", which claims the benefit of U.S. Provisional Patent Application Ser. No. 63/014,839, filed Apr. 24, 2020, entitled "INDUSTRIAL VEHICLE DISTANCE AND RANGE MEASUREMENT DEVICE CALIBRATION", the entire disclosures of both of which are hereby incorporated by reference herein.

BACKGROUND

Various aspects of the present disclosure relate generally to industrial vehicles and specifically to calibrating distance and range measurement devices (e.g., laser scanners, 3-D cameras, light detection and ranging (LIDAR) devices, etc.) coupled to the industrial vehicle.

Wireless strategies are being deployed by business operations, including distributors, retail stores, manufacturers, etc., to improve the efficiency and accuracy of business operations. Wireless strategies may also be deployed by such business operations to avoid the insidious effects of constantly increasing labor and logistics costs.

In a typical wireless implementation, workers are linked to a management system executing on a corresponding computer enterprise via a mobile wireless transceiver. For instance, in order to move items about the operator's facility, workers often utilize industrial vehicles, including for example, forklift trucks, hand and motor driven pallet trucks, etc. The wireless transceiver is used as an interface to the management system to direct workers in their tasks, e.g., by instructing workers where and/or how to pick, pack, put away, move, stage, process or otherwise manipulate the items within the operator's facility.

The wireless transceiver may also be used in conjunction with a suitable input device to scan, sense or otherwise read tags, labels or other identifiers to track the movement of designated items within the facility. The input devices that are coupled to the industrial vehicle should be calibrated, including a mechanical orientation so the input device may scan a specified viewing area. This mechanical orientation can compensate for tolerances in building the industrial vehicles and allow for higher accuracy in readings from the input device.

BRIEF SUMMARY

According to aspects, a process for calibrating a distance and range measurement device (e.g., laser scanner, 3-D camera, Light detection and ranging (LIDAR) devices, ultrasonic device, etc.) coupled to an industrial vehicle comprises taking a first measurement of an emission (e.g., a laser beam) from the distance and range measurement device at a first yaw angle relative to a roll axis of the distance and range measurement device. For example, the first yaw angle can be forty-five degrees, twenty degrees, negative seventy degrees, etc. with respect to the roll axis. In other words, the first yaw angle may be any desired angle with reference to the roll axis except zero degrees and plus/minus ninety degrees.

The process further comprises taking a second measurement of the emission from the distance and range measurement device at a second yaw angle relative to the roll axis. In some embodiments, the second yaw angle is within an angular tolerance of the first yaw angle but in an opposite direction of the first yaw angle from the roll axis. For example, if the first yaw angle is forty-five degrees, the second yaw angle is within an angular tolerance of negative forty-five degrees. In another example, if the first yaw angle is negative fifty-five degrees, then the second yaw angle is within an angular tolerance of fifty-five degrees. The angular tolerance can be any number, but a smaller number will provide better calibration results. In some embodiments, two different angles may be used for the two yaw angles (i.e., two yaw angles whose absolute values are not within the angular tolerance of each other).

The process further comprises determining that an inclination relative to the roll axis (i.e., roll angle) is correct when the first measurement and the second measurement are within a roll tolerance of each other. Again, the smaller the roll tolerance is, the better calibrated the distance and range measurement device will be. In embodiments where two different yaw angles are used, one of the measurements should be scaled before comparing to determine if they are within the roll tolerance of each other.

According to further aspects of the present disclosure, in some embodiments, if the second measurement is not within the roll tolerance of the first measurement, the distance and range measurement device is not calibrated properly, and an adjustment direction is determined based on the first measurement and the second measurement.

According to still further aspects of the present disclosure, in various embodiments, an adjustment direction is determined based on the first measurement and the second measurement, and the distance and range measurement device is adjusted according to the adjustment direction and the adjustment magnitude with motors on the industrial vehicle. In other embodiments, the distance and range measurement device is adjusted according to the adjustment direction and the adjustment magnitude by a third party (e.g., a technician).

According to yet further aspects of the present disclosure, in several embodiments, the adjustment direction is displayed on a display of the industrial vehicle. New first and second measurements are taken at new first and second yaw angles, respectively. In many embodiments, the new first yaw angle is within the angular tolerance of the first yaw angle. However, in some embodiments, the new second yaw angle is not within the angular tolerance of the first yaw angle.

According to aspects, a process for calibrating a distance and range measurement device (e.g., laser scanner, 3-D camera, Light detection and ranging (LIDAR) devices, ultrasonic device, etc.) coupled to an industrial vehicle comprises determining a virtual emission length based on a length of a scan field, a height that the scan field is above a floor, and a pitch angle of the distance and range measurement device. Once the virtual emission length is determined, a third measurement of the emission from the distance and range measurement device at a pitch angle is taken. The third measurement may be one of the first measurement, the second measurement, or neither. If the third measurement and the virtual emission length are within a pitch tolerance of each other, then the distance and range measurement device is calibrated correctly with respect to the pitch axis (i.e., the pitch angle of the distance and range measurement device is correct).

In numerous embodiments, if the third measurement is not within the pitch tolerance of the virtual emission length, then the distance and range measurement device is not calibrated correctly with respect to the pitch axis, and an adjustment direction is determined based on the third measurement and the virtual emission length. In some embodiments, an adjustment magnitude is determined based on the third measurement and the virtual emission length, and the distance and range measurement device is automatically adjusted based on the adjustment direction and the adjustment magnitude using motors. In other embodiments, the adjustment direction and magnitude are displayed on a display device of the industrial vehicle for a third party to adjust the distance and range measurement device.

DETAILED DESCRIPTION

According to various aspects of the present disclosure, systems, and processes for calibrating a distance and range measurement device (e.g., laser, scanner, 3-D camera, light detection and ranging (LIDAR) device, ultrasonic device, etc.) coupled to an industrial vehicle. Traditional distance and range measurement device calibration processes require a separate laptop with an adapter that couples to a sensor of the distance and range measurement device, special software on the laptop, and a special alignment gauge. However, through the calibration processes and systems described herein, the distance and range measurement device may be calibrated without a need for any of those items. Instead, a calibration process may be performed using a level floor and software on the industrial vehicle. In embodiments with automatic adjusting of the distance and range measurement device, motors to adjust the distance and range measurement device are also required. However, in embodiments where a third party (e.g., a technician) may adjust the distance and range measurement device based on the adjustment magnitude and adjustment direction, the motors are not required.

Example Industrial Environment Layout

Figure 1:
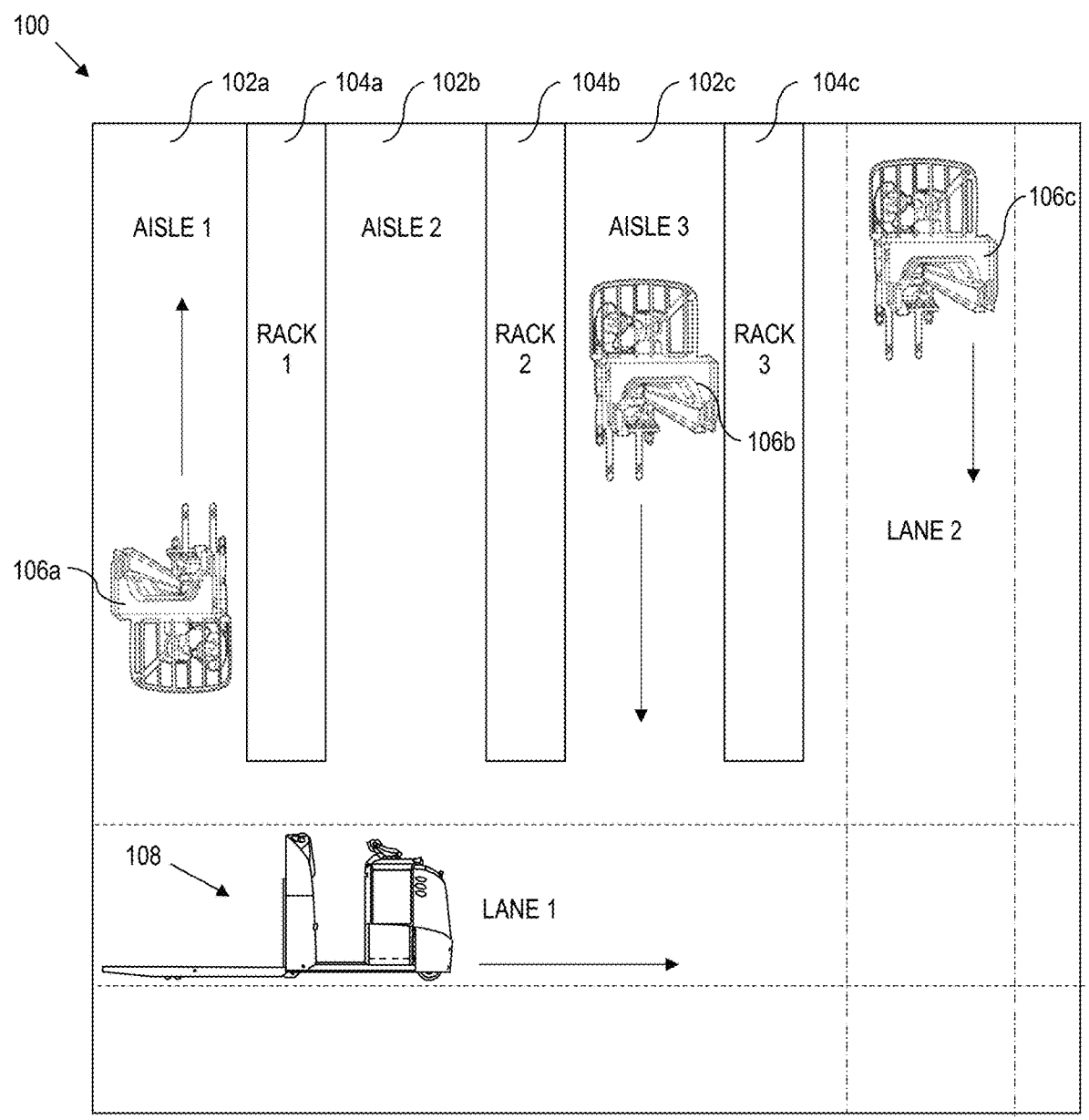
FIG. 1 is an example layout of an industrial environment, according to various aspects of the present disclosure.

Referring now to FIG. 1 an example of an industrial environment (e.g., warehouse, supply yard, loading dock, manufacturing facility, etc.) layout 100 is shown. In a typical stock picking operation, an operator of an industrial vehicle fills orders from available stock items that are located in storage areas provided down one or more aisles within the industrial environment. In this example industrial environment layout 100, there are three aisles 102a, 102b, 102c (collectively 102), which are separated by three racks 104a, 104b, 104c (collectively 104).

A rack is a structure that can be used to stock and store various items such as consumer products or materials and can vary in both size and structure. Examples of racks include, but are not limited to selective pallet racks, drive-in racks, drive-through racks, flow racks, gravity racks, and pushback racks. Racks may also have multiple vertical tiers to expand storage capacity.

During a typical stock picking operation, an operator may drive an industrial vehicle 106 to a first location where item(s) on a first order are to be picked (e.g., aisle 1). In a pick process, the operator retrieves the ordered stock item(s) from their associated storage area(s) (e.g., racks) and places the picked stock on a pallet, collection cage, other support structure carried by the industrial vehicle, or on the industrial vehicle itself. The operator then advances the industrial vehicle to the next location where a subsequent item is to be picked. The above process is repeated until all stock items on the order have been picked. Alternatively, the operator retrieves a packaged item such as a pallet, crate, box, container, or other like item with the industrial vehicle 106 and repeat the process until all packages have been retrieved and moved to a new location.

The operator may be required to repeat the pick process several hundred times per order. Moreover, the operator may be required to pick numerous orders per shift. As such, the operator may be required to spend a considerable amount of time relocating and repositioning the industrial vehicle, which reduces the time available for the operator to spend picking stock.

Further, it is not uncommon for multiple operators, each controlling an industrial vehicle, to pick orders simultaneously. For example, three traditional forklift trucks 106a-c (e.g., counterbalance forklifts, reach trucks, order pickers, stock picker, stackers, etc.) and one pallet truck 108 (e.g., a low-level order picker, a quick pick remote truck, a center-control pallet truck, etc.) are shown.

System Overview

Figure 2:
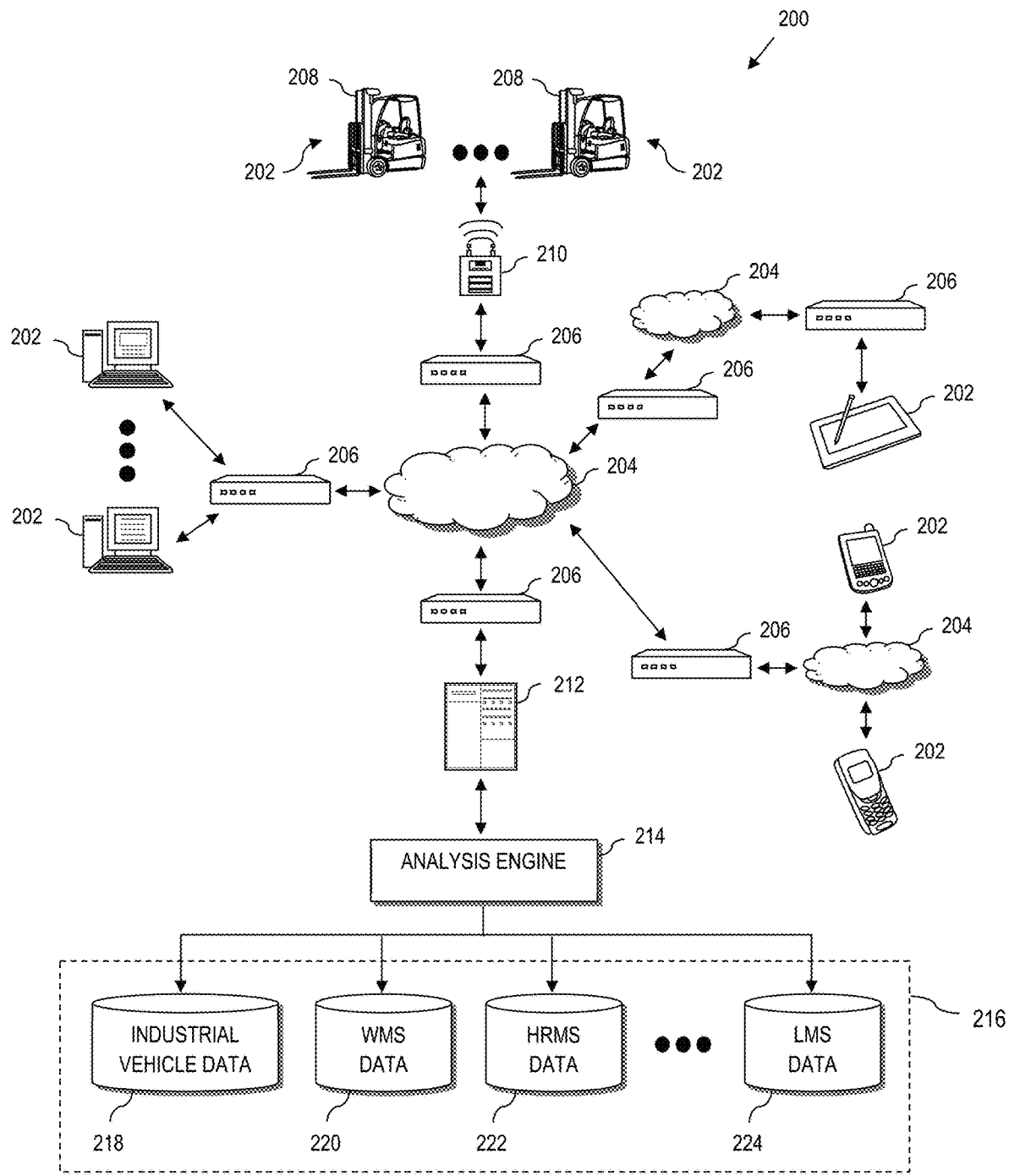
FIG. 2 is a flow diagram of a network system, according to aspects of the present disclosure.

Referring now to the drawings and in particular to FIG. 2, a general diagram of a system 200 is illustrated according to various aspects of the present disclosure. The illustrated system 200 is a special purpose (particular) computing environment that includes a plurality of hardware processing devices (designated generally by reference number 202) that are linked together by one or more network(s) (designated generally by reference number 204).

The network(s) 204 provides communication links between the various processing devices 202 and may be supported by networking components 206 that interconnect the processing devices 202, including for example, routers, hubs, firewalls, network interfaces, wired or wireless communication links and corresponding interconnections, cellular stations and corresponding cellular conversion technologies (e.g., to convert between cellular and TCP/IP, etc.). Moreover, the network(s) 204 may comprise connections using one or more intranets, extranets, local area networks (LAN), wide area networks (WAN), wireless networks (Wi-Fi), the Internet, including the world wide web, cellular and/or other arrangements for enabling communication between the processing devices 202, in either real time or otherwise (e.g., via time shifting, batch processing, etc.).

A processing device 202 can be implemented as a server, personal computer, laptop computer, netbook computer, purpose-driven appliance, special purpose computing device and/or other device capable of communicating over the network 204. Other types of processing devices 202 include for example, personal data assistant (PDA) processors, palm computers, cellular devices including cellular mobile telephones and smart telephones, tablet computers, an electronic control unit (ECU), a display of the industrial vehicle, etc.

Still further, a processing device 202 is provided on one or more industrial vehicles 208 such as a forklift truck, reach truck, stock picker, automated guided vehicle, turret truck, tow tractor, rider pallet truck, walkie stacker truck, quick pick remote truck, etc. In the example configuration illustrated, the industrial vehicles 208 wirelessly communicate through one or more access points 210 to a corresponding networking component 206, which serves as a connection to the network 204. Alternatively, the industrial vehicles 208 can be equipped with Wi-Fi, cellular or other suitable technology that allows the processing device 202 on the industrial vehicle 208 to communicate directly with a remote device (e.g., over the networks 204).

The illustrated system 200 also includes a processing device implemented as a server 212 (e.g., a web server, file server, and/or other processing device) that supports an analysis engine 214 and corresponding data sources (collectively identified as data sources 216). The analysis engine 214 and data sources 216 provide domain-level resources to the industrial vehicles 208. Moreover, the data sources 216 store data related to activities of the industrial vehicles 208.

In an exemplary implementation, the data sources 216 include a collection of databases that store various types of information related to an operation (e.g., an industrial environment, distribution center, retail store, manufacturer, etc.). However, these data sources 216 need not be co-located. In the illustrative example, the data sources 216 include databases that tie processes executing for the benefit of the enterprise, from multiple, different domains. In the illustrated example, data sources 216 include an industrial vehicle information database 218 (supporting processes executing in an industrial vehicle operation domain), a warehouse management system (WMS) 220 (supporting processes executing in WMS domain that relate to movement and tracking of goods within the operating environment), a human resources management system (HRMS) 222 (supporting processes executing in an HRMS domain), a geo-feature management system 224 (supporting processes that utilize environmental-based location tracking data of industrial vehicles in a geo-domain), etc. The above list is not exhaustive and is intended to be illustrative only.

Still further, the industrial vehicles 208 may include a short range, direct communication with electronic badges that can be remote, but in relatively close proximity (by way of example, 15-20 meters) to a corresponding industrial vehicle 208. Electronic badges can also be positioned on machines, fixtures, equipment, other objects, an industrial vehicle operator, combinations thereof, etc. Electronic badges are discussed in greater detail in U.S. patent application Ser. No. 15/685,163 by Philip W. Swift entitled INDUSTRIAL ELECTRONIC BADGE filed Aug. 24, 2017, the entirety of which is hereby incorporated by reference.

In certain illustrative implementations, the industrial vehicles 208 themselves can communicate directly with each other via electronic badge communicator technology, e.g., via a short-range direct communication link, thus forming a mesh network, or temporary mesh network.

Industrial Vehicle

As noted above, in certain contexts and roles, a processing device 202 is provided on an industrial vehicle 208. Here, the processing device 202 is a special purpose, particular computer, such as a device that mounts to or is otherwise integrated with the industrial vehicle 208. The processing device 202 includes a processor coupled to memory to carry out instructions. However, the execution environment of the processing device 202 is further tied into the industrial vehicle 208 making it a particular machine different from a general-purpose computer.

For instance, an example processing device 202 on an industrial vehicle is a mobile asset information linking device (see information linking device 38) as set out in U.S. Pat. No. 8,060,400, the disclosure of which is incorporated by reference in its entirety. In certain illustrative implementations, the processing device 202 also communicates with components of the corresponding industrial vehicle 208 (e.g., via a vehicle network bus (e.g., controller area network bus (CAN bus)), short range wireless technology (e.g., via Bluetooth or other suitable approach), or other wired connection, examples of which are set out further in U.S. Pat. No. 8,060,400, already incorporated by reference.

Figure 3:
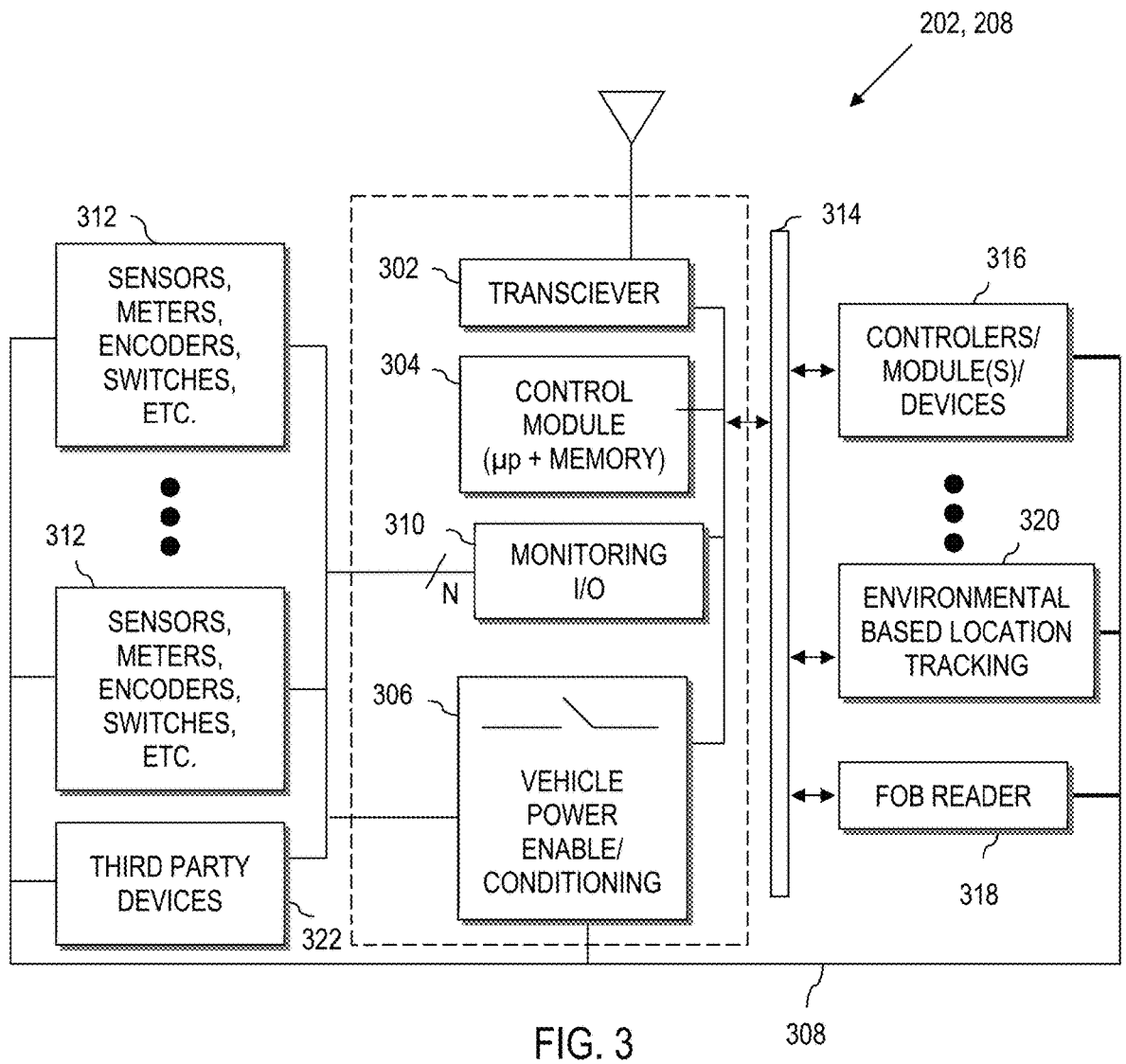
FIG. 3 is a hardware system diagram that can be used in an industrial vehicle, according to aspects of the present disclosure.

Referring to FIG. 3, a processing device 202 is implemented as an information linking device that comprises the necessary circuitry to implement wireless communication, data and information processing, and wired (and optionally wireless) communication to components of the industrial vehicle. As a few illustrative examples, the processing device 202 includes a transceiver 302 for wireless communication, which is capable of both transmitting and receiving signals. Although a single transceiver 302 is illustrated for convenience, in practice, one or more wireless communication technologies may be provided. For instance, the transceiver 302 may be able to communicate with a remote server, e.g., server 212 and hence, interact with the analysis engine 214 of FIG. 2, via 802.11.xx across the access points 210 of FIG. 2. The transceiver 302 may also optionally support other wireless communication, such as cellular, Bluetooth, infrared (IR) or any other technology or combination of technologies. For instance, using a cellular to IP (Internet protocol) bridge, the transceiver 302 may be able to use a cellular signal to communicate directly with a remote server, e.g., a manufacturer server. The transceiver 302 may also communicate with a wireless remote-control device that controls the industrial vehicle 208. The remote-control device may be controlled by an industrial vehicle operator, or by the system 200.

The processing device 202 also comprises a control module 304, having a processor coupled to memory for implementing computer instructions. Additionally, the control module 304 implements processes such as operator log on, pre-use inspection checklists, data monitoring and other features, examples of which are described more fully in U.S. Pat. No. 8,060,400 to Wellman, already incorporated by reference herein.

The processing device 202 further includes vehicle power enabling circuitry 306 to selectively enable or disable the industrial vehicle 208. In certain implementations, the vehicle power enabling circuitry 306 can partially enable the industrial vehicle 208 for operation, or fully enable the industrial vehicle 208 for operation, e.g., depending upon proper operator login. For instance, the industrial vehicle power enabling circuitry 306 can provide selective power to components via power line 308. Various functions of the industrial vehicle 208 can be controlled by the vehicle power enabling circuitry 306 (e.g., in conjunction with the control module 304) such as traction control, steering control, brake control, drive motors, etc.

Still further, the processing device 202 includes a monitoring input output (I/O) module 310 to communicate via wired or wireless connection to peripheral devices mounted to or otherwise on the industrial vehicle, such as sensors, meters, encoders, switches, etc. (collectively represented by reference number 312).

The processing device 202 is coupled to and/or communicates with other industrial vehicle system components via a suitable industrial vehicle network system 314, e.g., a vehicle network bus. The industrial vehicle network system 314 is any wired or wireless network, bus or other communications capability that allows electronic components of the industrial vehicle 208 to communicate with each other. As an example, the industrial vehicle network system may comprise a controller area network (CAN) bus, ZigBee, Bluetooth, Local Interconnect Network (LIN), time-triggered data-bus protocol (TTP) or other suitable communication strategy.

As will be described more fully herein, utilization of the industrial vehicle network system 314 enables seamless integration of the components of the processing device 202 on the industrial vehicle 208 into the native electronics including controllers of the industrial vehicle 208. Moreover, the monitoring I/O module 310 can bridge any electronic peripheral devices 312 to the industrial vehicle network system 314. For instance, as illustrated, the processing device 202 connects with, understands and is capable of communication with native vehicle components, such as controllers, modules, devices, bus enabled sensors, displays, lights, light bars, sound generating devices, headsets, microphones, haptic devices, etc. (collectively referred to by reference number 316).

The processing device 202 can also communicate with a fob 318 (or keypad, card reader or any other device) for receiving operator log in identification. Still further, the processing device 202 can include a display and/or other features to provide desired processing capability.

According to yet further aspects of the present disclosure, an environmental based location tracking system 320 may be provided on the industrial vehicle 208, which can communicate across the industrial vehicle network system 314. The environmental based location tracking system 320 enables the industrial vehicle 208 to be spatially aware of its location within the industrial environment. The environmental based location tracking system 320 may comprise a local awareness system that utilizes markers, including RFID (radio-frequency identification), beacons, lights, or other external devices to allow spatial awareness within the industrial environment. The environmental based location tracking system 320 may use one or more of a global positioning system (GPS), or triangulation system to determine position. The environmental based location tracking system 320 may also use knowledge read from vehicle sensors, encoders, accelerometers, etc., or other system that allows location to be determined.

As a further example, the environmental based location tracking system 320 may include a transponder, and the position of the industrial vehicle may be triangulated within the industrial environment. Yet further, the environmental based location tracking system 320 may use combinations of the above and/or other technologies to determine the current (real-time) position of the industrial vehicle. As such, the position of the industrial vehicle can be continuously ascertained (e.g., every second or less) in certain implementations. Alternatively, other sampling intervals can be derived to continuously (e.g., at discrete defined time intervals, periodic or otherwise constant and recurring time intervals, intervals based upon interrupts, triggers or other measures) determine industrial vehicle position over time.

The processing device 202 may also be connected to other devices, e.g., third party devices 322 such as RFID scanners, displays, meters, weight sensors, fork load sensors, or other devices.

Calibrating Roll Angle

Figure 4:
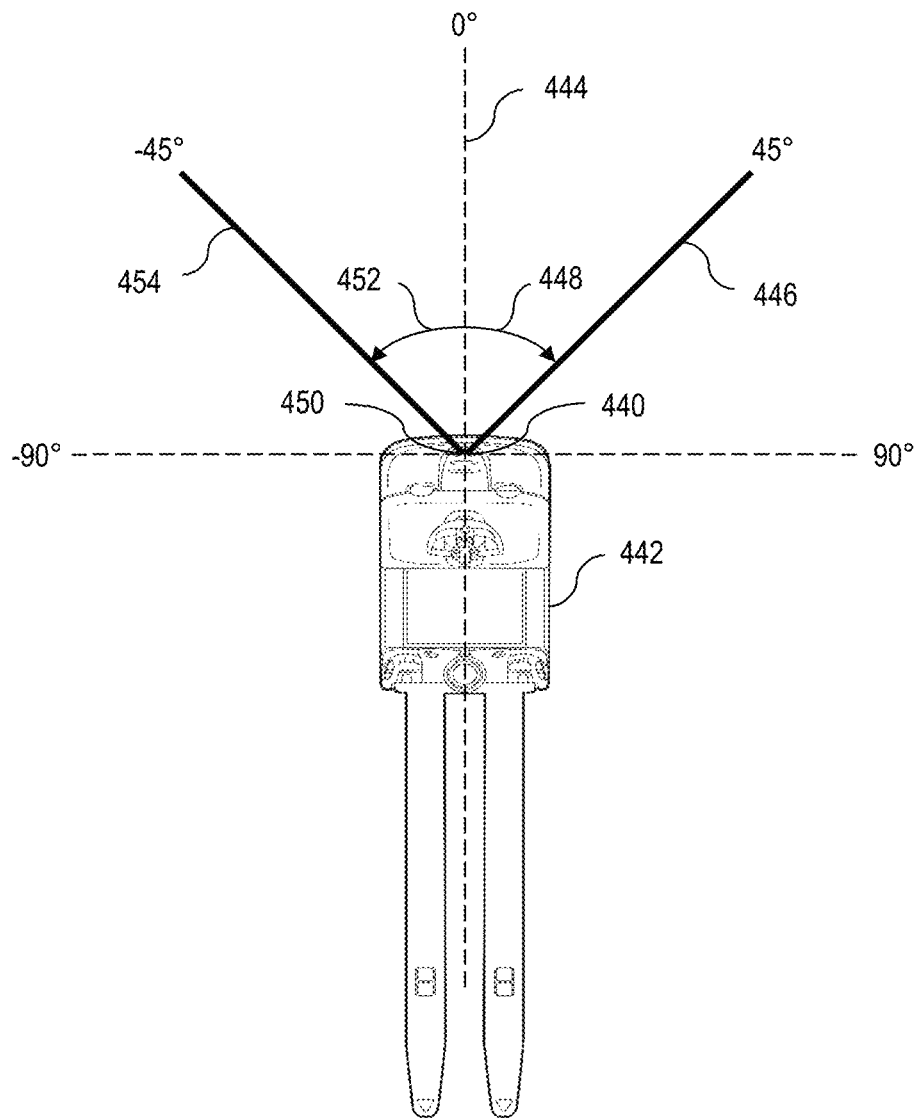
FIG. 4 is a diagram illustrating a process for calibrating a roll angle of a distance and range measurement device coupled to an industrial vehicle, according to various aspects of the present disclosure.

Turning now to FIG. 4, a top-down diagram illustrates a process for calibrating a roll angle of a distance and range measurement device 440 (e.g., laser, scanner, 3-D camera, light detection and ranging (LIDAR) device, ultrasonic device, etc.) mounted to an industrial vehicle 442, where the calibration is relative to a roll axis of the distance and range measurement device 440. As used herein a roll axis 444 is the axis that extends from the distance and range measurement device ahead and behind distance and range measurement device.

When calibrating the distance and range measurement device 440, the distance and range measurement device is activated such that an emission 446 (e.g., a laser beam if the distance and measurement device includes a laser) from the distance and range measurement device is at a first yaw angle 448 relative to the roll axis 444 and pointed toward the ground at a distance from the industrial vehicle (e.g., one meter in front of the industrial vehicle). A sensor 450 senses a reflection of the emission and converts the reflection (e.g., using time of flight of the emission) to a length of the emission at the first angle. Thus, a first measurement of the emission from the distance and range measurement device at a first yaw angle relative to a roll axis of the distance and range measurement device is taken.

A second measurement is taken to determine a length of a second emission 454 at a second yaw angle 452 (similar to above). In many embodiments, the first measurement and second measurement may be taken from one scan that includes both the first and second yaw angles. The second yaw angle may be within an angular tolerance (the smaller the tolerance the more accurate the calibration will be) of the first yaw angle but in an opposite direction of the first yaw angle from the roll axis. For example, if the first yaw angle is positive forty-five degrees from the roll axis (in the roll-pitch plane), then the second yaw angle could be within an angular tolerance (e.g., 0.01 degrees) of negative forty-five degrees in the roll-pitch plane from the roll axis.

Also, two different angles may be used for the two yaw angles (i.e., two yaw angles whose absolute values are not within the angular tolerance). One of the measurements should then be scaled before comparing below. For example, the first measurement should be scaled by a cosine of the first yaw angle divided by a cosine of the second yaw angle. On the other hand, the second measurement may be scaled by a cosine of the second yaw angle divided by a cosine of the first yaw angle. Thus, if the first yaw angle is forty-five degrees and the second yaw angle is negative twenty degrees, then the first measurement is scaled by 0.707/0.94=0.752. Note that the result is the same for an example if the first yaw angle is forty-five degrees and the second yaw angle is positive twenty degrees.

A determination that the roll angle is correct is made if a difference between the first measurement and second measurement is within a roll tolerance. In some embodiments the determination includes comparing the first measurement to the second measurement, and if they are within the roll tolerance of each other (the smaller the roll tolerance is, the more accurate the calibration will be) then the roll angle of the distance and range measurement device is correctly calibrated. For example, if the first measurement is 1.540 meters, the second measurement is 1.538 meters, and the roll tolerance is 0.003 meters, then the first measurement and the second measurement are within the roll tolerance. In some embodiments, the comparison is performed by a processor on the industrial vehicle. In other embodiments, the comparison is performed by a processor separate from the industrial vehicle. Recall that if two different yaw angles are used (i.e., two yaw angles whose absolute values are not within the angular tolerance), then one of the measurements should be scaled as described above.

If the first measurement is not within the roll tolerance of the second measurement, then the distance and range measurement device 440 must be rolled. In such cases, if the first measurement is greater than the second measurement, then the distance and range measurement device 440 should be rolled in a clockwise direction (standing behind the industrial vehicle). On the other hand, if the second measurement is greater than the first measurement, then the distance and range measurement device 440 should be rolled in a counterclockwise direction (standing behind the industrial vehicle) (i.e., an adjustment direction is determined). The clockwise/counterclockwise examples discussed above assume that the first angle is a positive angle from the roll axis; if the first yaw angle is a negative angle from the roll axis, then the clockwise/counterclockwise directions would be reversed. Further, a magnitude of the difference between the first measurement and the second measurement will guide how many degrees that the distance and range measurement device 440 should be rolled (i.e., an adjustment magnitude is determined).

If the first measurement is not within the roll tolerance of the second measurement, then the distance and range measurement device 440 can then be adjusted (e.g., rolled) according to the adjustment direction and the adjustment magnitude. In some embodiments, the adjustment is performed automatically by the industrial vehicle. In other embodiments, the adjustment direction and the adjustment magnitude are displayed on a screen of the industrial vehicle or transmitted (as discussed above) to a remote device for display. In some embodiments, the roll angle of the distance and range measurement device is considered calibrated after the adjustment is made. In other embodiments, after an adjustment is made, then two more measurements (i.e., a new first measurement and a new second measurement) are taken as described above. In some of these embodiments, the new first yaw angle and new second yaw angle are the same angles as the first and second yaw angles above. However, in other embodiments, the new first yaw angle and new second yaw angle are different angles from the first and second yaw angles above. For example, if the first and second yaw angles are positive forty-five degrees and negative forty-five degrees from the roll axis, then the new first and new second yaw angles may be positive twenty degrees and negative twenty degrees from the roll axis. The process is iteratively repeated until the first and second measurements are within the roll tolerance of each other.

Calibrating Pitch Angle

Figure 5:
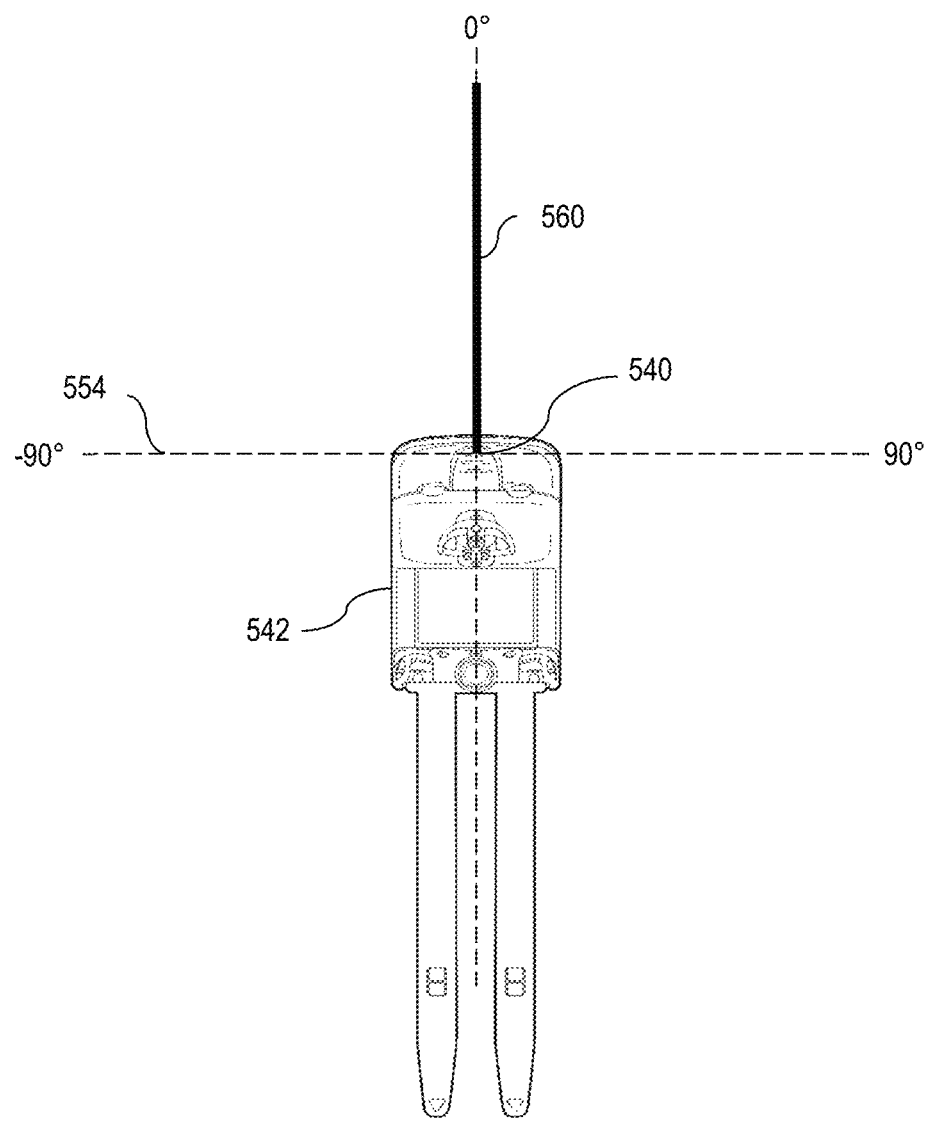
FIG. 5 is a diagram illustrating a process for calibrating a pitch angle of a distance and range measurement device coupled to an industrial vehicle, according to various aspects of the present disclosure.
Figure 6:
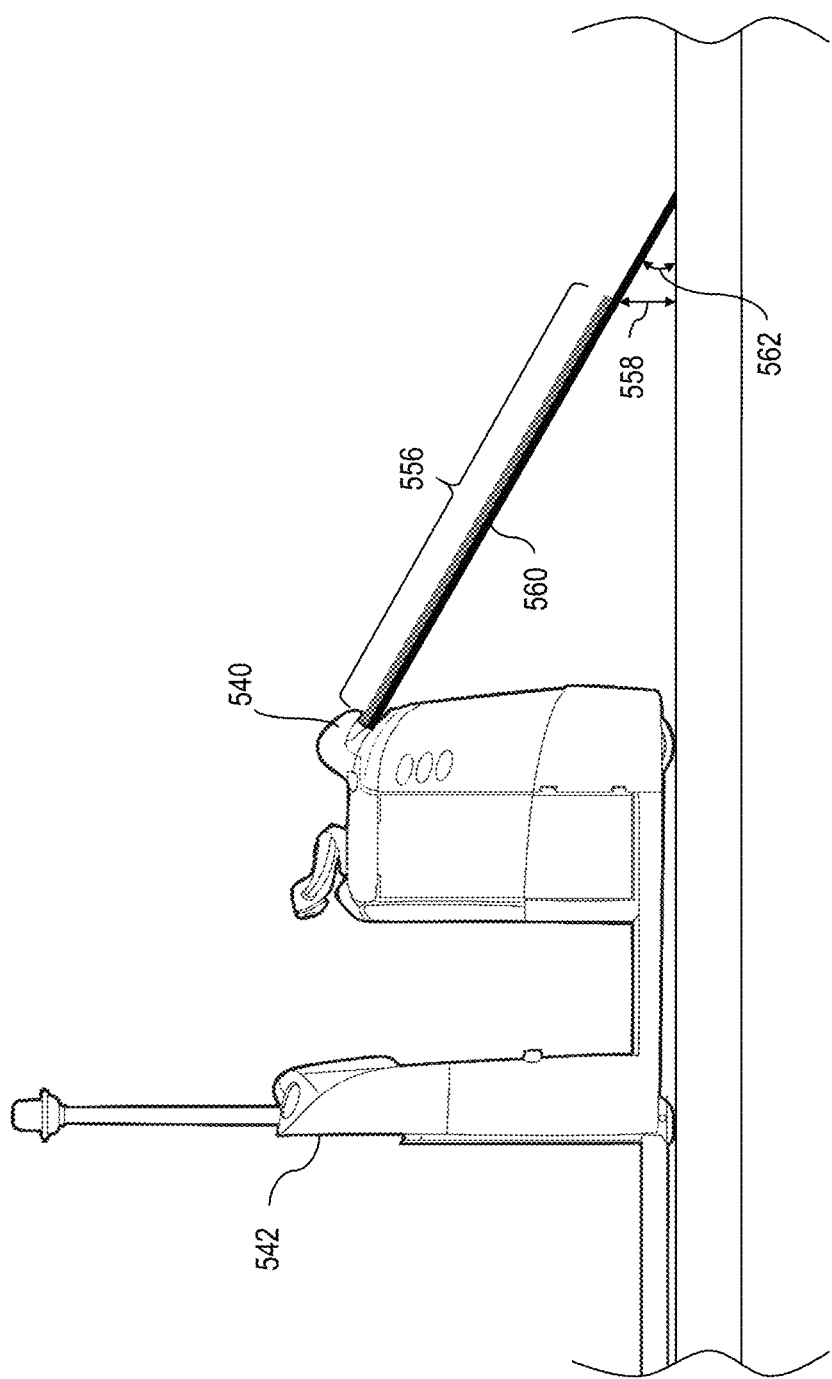
FIG. 6 is a diagram illustrating more of the process of FIG. 5 for calibrating a roll angle and a pitch angle of a distance and range measurement device coupled to an industrial vehicle, according to various aspects of the present disclosure.

FIGS. 5-6 illustrate a process for calibrating a distance and range measurement device 540 (e.g., laser, scanner, 3-D camera, Light detection and ranging (LIDAR) device, ultrasonic device etc.) coupled to an industrial vehicle 542, where the calibration is relative to a pitch axis 554 of the distance and range measurement device 540. As used herein a pitch axis 554 is the axis that is perpendicular to the front of the distance and range measurement device.

A scan field is determined to have a length 556, which is a distance from the distance and range measurement device 540 to an end of the scan field, which ends a predetermined distance 558 above a floor (usually a few centimeters). As shown in FIG. the scan field extends two-hundred-seventy degrees in front of the distance and range measurement device. However, the scan field may be any desired size. A virtual emission length 560 (designated as $L_b$) can be determined using the scan field length 556 (designated as $L_{sf}$), the predetermined distance 558 (designated as h), and the angle 562 of the distance and range measurement device in the yaw-roll plane relative to the pitch axis 554 (i.e., the pitch angle that the distance and range measurement device should be when the distance and range measurement device is pitched properly (i.e., calibrated properly relative the pitch axis)) (designated as a). A formula to determine $L_b$ would be:

$$L_b = L_{sf}(h/\sin(\alpha))$$

where:
  $L_{sf}$ is the length of the scan field;
  h is the height that the scan field ends above a floor; and
  α is the angle when the pitch angle of the distance and range measurement device is correct.

To calibrate the distance and range measurement device 540 along the pitch axis 554 (i.e., to determine if the distance and range measurement device is pitched properly), an emission 546 from the distance and range measurement device 540 is directed toward the floor. As shown in FIG. 5, the emission 546 is in line with the roll axis. However, the emission 546 may be at any yaw angle (while still being within the scan field and the emission can hit the ground/floor).

A measurement of the emission from the distance and range measurement device is taken. The measurement may be the first measurement of the calibration process for the roll angle described above, the second measurement of the calibration process for the roll angle described above, or a measurement that is independent from those measurements. The measurement is then compared to the virtual emission length. In some embodiments, the comparison is performed by a processor on the industrial vehicle. In other embodiments, the comparison is performed by a processor separate from the industrial vehicle.

A determination that the pitch angle is correct is made if a difference between the measurement and the virtual emission length is within a pitch tolerance. In some embodiments that determination includes comparing the measurement to the virtual emission length to determine if the measurement is within the pitch tolerance of the virtual emission length.

However, if the measurement is not within the pitch tolerance of the virtual emission length and if the measurement is greater than the virtual emission length, then the distance and range measurement device should be pitched downward as an adjustment direction. On the other hand, if the measurement is less than the virtual emission length, then the distance and range measurement device should be pitched upward. A difference between the measurement and the virtual emission length is related to an adjustment magnitude (e.g., how many degrees) the distance and range measurement device should be pitched.

If the measurement is not within the pitch tolerance of the virtual emission length, then the distance and range measurement device 540 can then be adjusted according to the adjustment direction and the adjustment magnitude. In some embodiments, the adjustment is performed automatically by the industrial vehicle. In other embodiments, the adjustment direction and the adjustment magnitude are displayed on a screen of the industrial vehicle or transmitted (as discussed above) to a remote device for display. In some embodiments, after an adjustment is made, then a new measurement is taken as described above. Thus, the process can iteratively be repeated until the measurement is within a pitch tolerance of the virtual emission length. In other embodiments, after an adjustment is made, it is assumed that the distance and range measurement device is calibrated properly.

Overall Calibration Process

Figure 7:
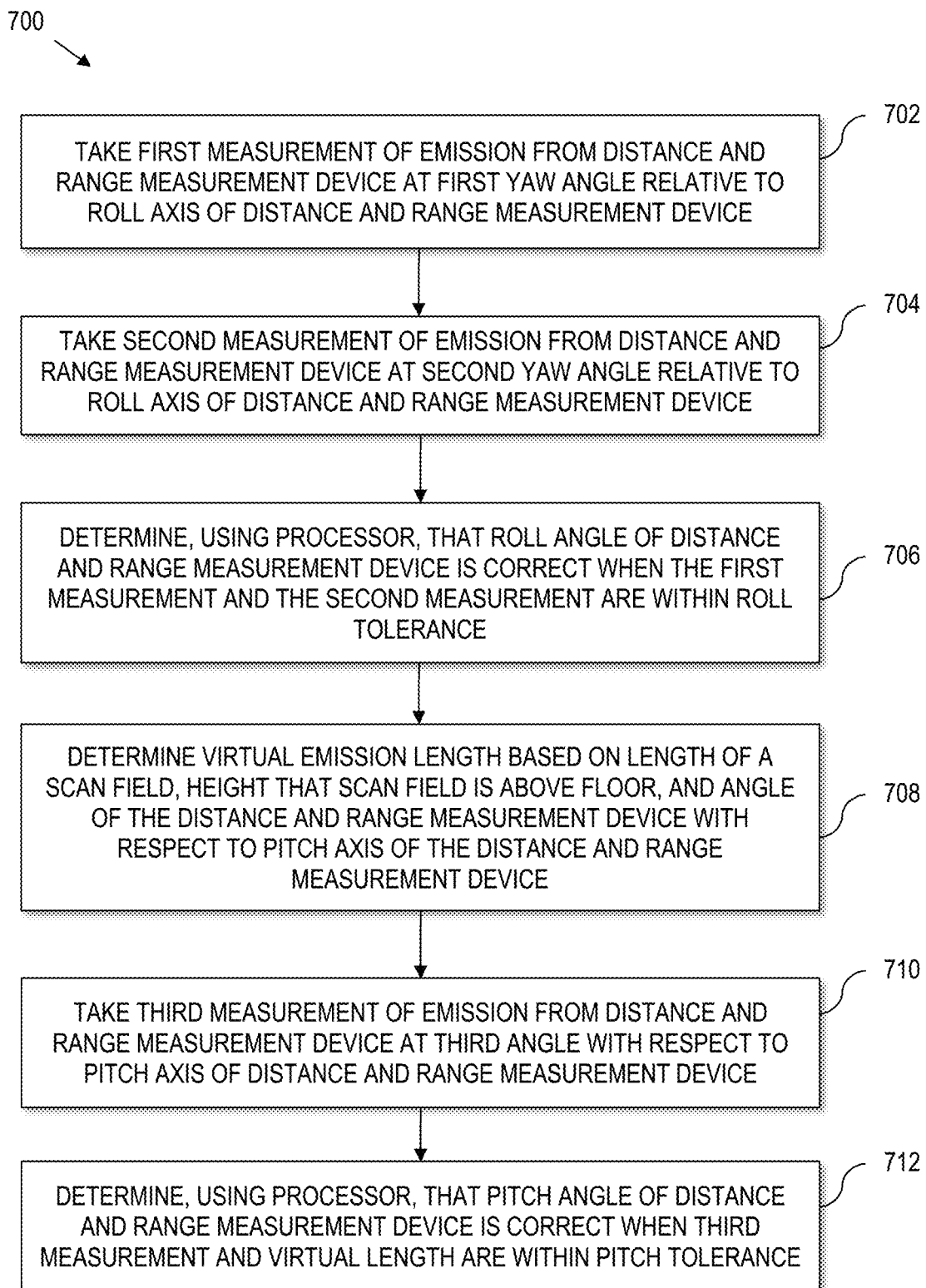
FIG. 7 is a flow chart illustrating the processes of FIGS. 4-6, according to various aspects of the present disclosure.

FIG. 7 is a flow chart that illustrates an overall process 700 for calibrating a distance and range measurement device (e.g., laser, scanner, 3-D camera, light detection and ranging (LIDAR) device, ultrasonic device, etc.) coupled to an industrial vehicle. At 702, a first measurement of an emission from the distance and range measurement device at a first yaw angle relative to a roll axis of the industrial vehicle is taken. For example, the distance and range measurement device is activated such that an emission from the distance and range measurement device at the first yaw angle relative to the roll axis and pointed toward the ground at a distance from the industrial vehicle (e.g., one meter in front of the industrial vehicle). A sensor senses a reflection of the emission and converts the reflection (e.g., using time of flight of the emission) to a first measurement of the emission at the first yaw angle. The first yaw angle may be any angle that is within a scan field of the distance and range measurement device except zero degrees and +/−ninety degrees. For example, the first yaw angle may be forty-five degrees from the roll axis. As another example, the first yaw angle may be negative twenty degrees from the roll axis.

At 704, a second measurement of the emission from the distance and range measurement device at a second yaw angle relative to the roll axis is taken. As mentioned above, the first measurement and the second measurement may be taken during a single scan. The second yaw angle may be within an angular tolerance of the first yaw angle but in an opposite direction of the first yaw angle from the roll axis. On the other hand, two different angles may be used for the two yaw angles (i.e., two yaw angles whose absolute values are not within the angular tolerance). One of the measurements should then be scaled before comparing below. For example, the first measurement should be scaled by a cosine of the first yaw angle divided by a cosine of the second yaw angle. On the other hand, the second measurement may be scaled by a cosine of the second yaw angle divided by a cosine of the first yaw angle.

At 706, a determination is made that a roll angle of the distance and range measurement device is correct when the first measurement and the second measurement are within a roll tolerance. In numerous embodiments, if the difference between the first measurement and the second measurement is within the roll tolerance, then the roll angle is correctly calibrated. In some embodiments, the determination is performed by a processor on the industrial vehicle. In other embodiments, the determination is performed by a processor separate from the industrial vehicle. For a more accurate calibration, the roll tolerance should be a small number. If the first measurement and the second measurement are within the roll tolerance, then the distance and range measurement device roll angle is correct (i.e., the distance and range measurement device is properly rotated along the roll axis). In the case where two different yaw angles are used for the first yaw angle and the second yaw angle, the scaled measurement should be used for the comparison with the unscaled measurement. For example, the scaled first measurement is compared to the non-scaled second measurement. Alternatively, the non-scaled first measurement is compared to the scaled second measurement.

If the first measurement and the second measurement are not within the roll tolerance of each other (i.e., the roll angle is incorrect), then the distance and range measurement device must be rolled around the roll axis by a roll adjustment. In such cases, if the first measurement is greater than the second measurement, then the distance and range measurement device should be rolled around the roll axis in a clockwise direction. On the other hand, if the second measurement is greater than the first measurement, then the distance and range measurement device should be rolled around the roll axis in a counterclockwise direction (i.e., a roll adjustment direction is determined). The clockwise/counterclockwise examples discussed above assume that the first yaw angle is a positive angle from the roll axis; if the first yaw angle is a negative angle from the roll axis, then the clockwise/counterclockwise directions would be reversed. Further, an adjustment magnitude may be based on the difference between the first measurement and the second measurement (i.e., a roll adjustment magnitude is determined). In some embodiments, the roll adjustment direction and the roll adjustment magnitude are determined using a processor on the industrial vehicle, while in other embodiments, the roll adjustment direction and the roll adjustment magnitude are determined using a processor separate from the industrial vehicle.

In some embodiments, the roll adjustment (i.e., based on the roll adjustment magnitude and the roll adjustment direction) is performed automatically by the industrial vehicle. In other embodiments, the roll adjustment direction and the roll adjustment magnitude are displayed on a screen of the industrial vehicle or transmitted to a remote device for display.

In some embodiments, after a roll adjustment is made, then two more measurements are taken as described above. In some of these embodiments, the new first yaw angle and new second yaw angle are the same angles as the first and second yaw angles above. However, in other embodiments, the new first yaw angle and new second yaw angle are different angles from the first and second yaw angles above. For example, if the first and second yaw angles are positive forty-five degrees and negative forty-five degrees from the roll axis, then the new first and new second yaw angles may be positive twenty degrees and negative twenty degrees from the roll axis. The process can be repeated until the first and second measurements are within the roll tolerance.

At 708, a virtual emission length (i.e., an expected emission length when the distance and range measurement device is calibrated properly) is determined based on a length of a scan field, a height that the scan field ends above a floor, and an angle of the distance and range measurement device with respect to a pitch axis of the industrial vehicle. For example, the virtual emission length ($L_b$) can be determined with the following equation:

$$L_b = L_{sf} + (h/\sin(\alpha))$$

where:

$L_{sf}$ is the length of the scan field;

h is the height that the scan field ends above a floor; and

α is the angle when the pitch angle of the distance and range measurement device is correct.

At 710, a third measurement is taken of the emission from the distance and range measurement device at a third angle with respect to the pitch axis of the industrial vehicle (i.e., a pitch angle). In some embodiments, the first measurement of 702 is used as the third measurement. In various embodiments, the second measurement of 704 is used as the third measurement. In several embodiments, the third measurement is different than the first and second measurements of 702 and 704. Further, the emission for the third measurement may be any yaw angle in the scan field with respect to the roll axis except zero degrees and +/−ninety degrees.

At 712, the third measurement is then compared to the virtual emission length determined at 708. If the measurement is within a pitch tolerance of the virtual emission length, then the pitch angle of the distance and range measurement device is correct.

On the other hand, if the measurement is not within the pitch tolerance of the virtual emission length (i.e., the pitch angle is incorrect), then if the measurement is greater than the virtual emission length, then the distance and range measurement device should be pitched (i.e., a pitch adjustment should be made) downward as a pitch adjustment direction. On the other hand, if the measurement is less than the virtual emission length, then the distance and range measurement device should be pitched upward. A difference between the measurement and the virtual emission length is related to a pitch adjustment magnitude (e.g., how many degrees) the distance and range measurement device should be pitched.

If the measurement is not within the pitch tolerance of the virtual emission length, then the distance and range measurement device can then be adjusted according to the pitch adjustment direction and the pitch adjustment magnitude. In some embodiments, the pitch adjustment is performed automatically by the industrial vehicle. In other embodiments, the pitch adjustment direction and the pitch adjustment magnitude are displayed on a screen of the industrial vehicle or transmitted to a remote device for display. In some embodiments, after a pitch adjustment is made, then another third measurement is taken as described above, and 708-712 are repeated until the measurement is within a pitch tolerance of the virtual emission length. In other embodiments, the pitch angle of the distance and range measurement device is assumed to be calibrated correctly after the pitch adjustment.

Once both the roll angle and the pitch angle of the distance and range measurement device are correctly calibrated, an indication that both angles are calibrated correctly (i.e., an indication of correct calibration) may be stored in memory on the industrial vehicle.

Portions of the calibration process 700 may be performed in a different order. For example, in FIG. 7, 702-706 are performed before 708-712. However, 708-712 may be performed concurrently with or before 702-706.

Normally, a distance and range measurement device calibration process would require a separate laptop with an adapter that couples to the laser sensor, special software on the laptop, and a special alignment gauge. Through the calibration process 700 described above, the distance and range measurement device may be calibrated without any of those items. Instead, a calibration process may be performed using a level floor and software on the industrial vehicle. In embodiments with automatic adjusting of the distance and range measurement device, motors to adjust the distance and range measurement device are also required. However, in embodiments where a third party (e.g., a technician) adjusts the distance and range measurement device based on the adjustment magnitude and adjustment direction, the motors are not required.

On Board Assistance

Figure 8:
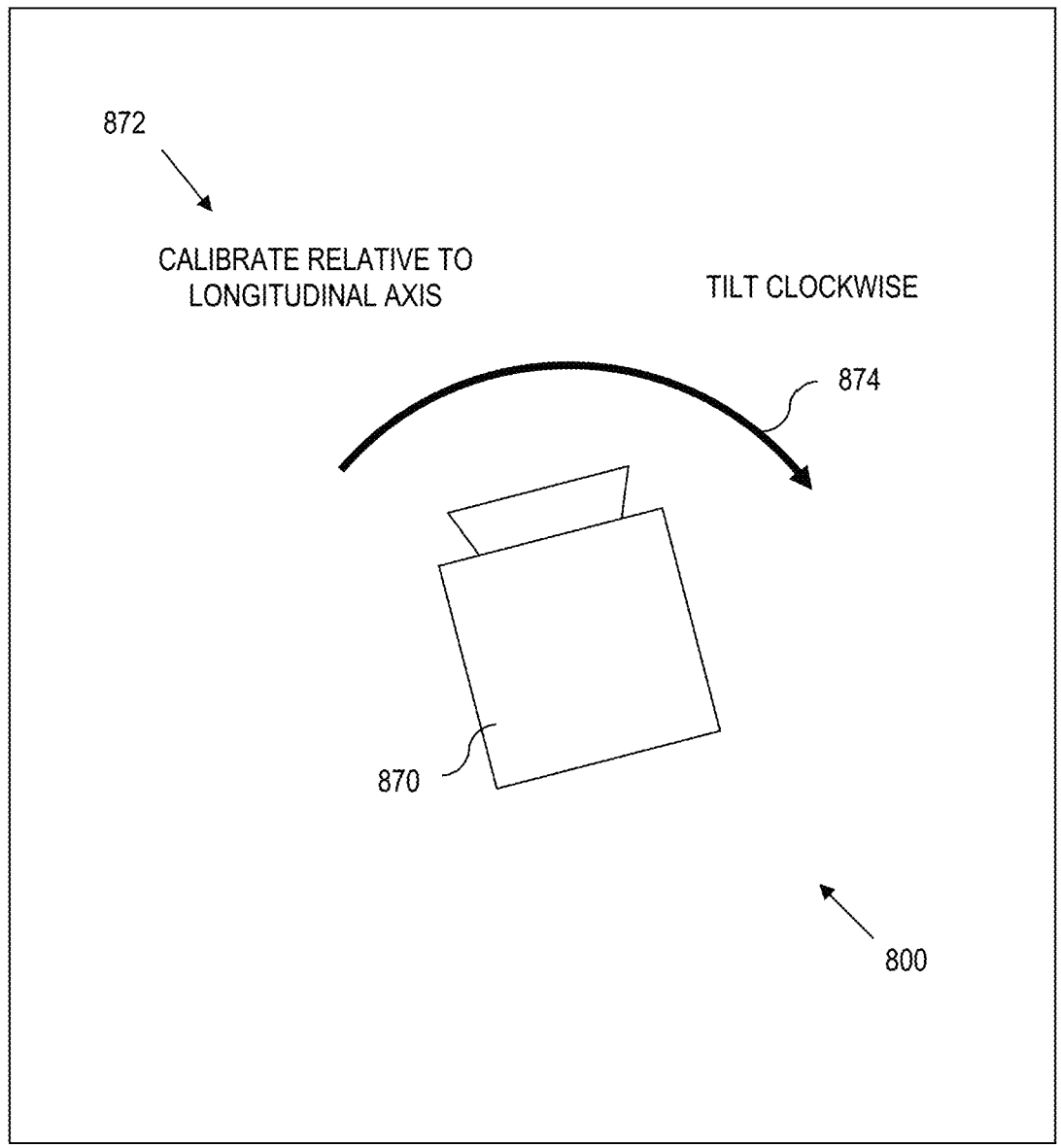
FIG. 8 is a diagram illustrating a display of an indication of an adjustment direction, according to various aspects of the present disclosure.

In embodiments where the determinations and comparisons are performed by the industrial vehicle and the distance and range measurement device is not automatically adjusted, the adjustment direction, the adjustment magnitude, or both may be shown on a display device of the industrial vehicle. FIG. 8 illustrates an embodiment of a display 800 on a display device of the industrial vehicle. The display 800 includes an icon of the distance and range measurement device 870, an indication 872 which axis is being calibrated, and the adjustment direction 874. In some embodiments, the adjustment magnitude is also displayed. This adjustment direction 874 and magnitude may be displayed in real time, so a technician knows how to adjust the distance and range measurement device. Further, when the distance and range measurement device is calibrated properly in one or both directions (i.e., the roll angle and/or pitch angle are correct as outlined above), then the display may indicate that the technician should stop adjustment in that direction (if only one angle is correct) or stop entirely (if both roll and pitch angles are correct).

In other embodiments, the display device may be a set of light-emitting diodes (LEDs). For example, if the display device is a left LED and a right LED, then when the right LED is active the adjustment should be in the clockwise direction, and when the left LED is active, the adjustment direction should be in the counterclockwise direction. In numerous embodiments, a brightness of the LED indicates the adjustment magnitude. As another example, if the display device is eight LEDs, then four LEDs to the right side of the display device may be used to indicate a clockwise adjustment direction, and the other four LEDs are used to indicate a counterclockwise adjustment. In this example, the adjustment magnitude may be indicated by how many of the LEDs are activated. For example, the three right-most LEDs being active would indicate a larger clockwise adjustment than if only the two right-most LEDs are active. In some embodiments, the display device may have separate sets of LEDs to indicate adjustment for the roll angle and the pitch angle. In other embodiments, the display device has one set of LEDs and an indicator which adjustment (roll or pitch) needs to be made.

Figure 9:
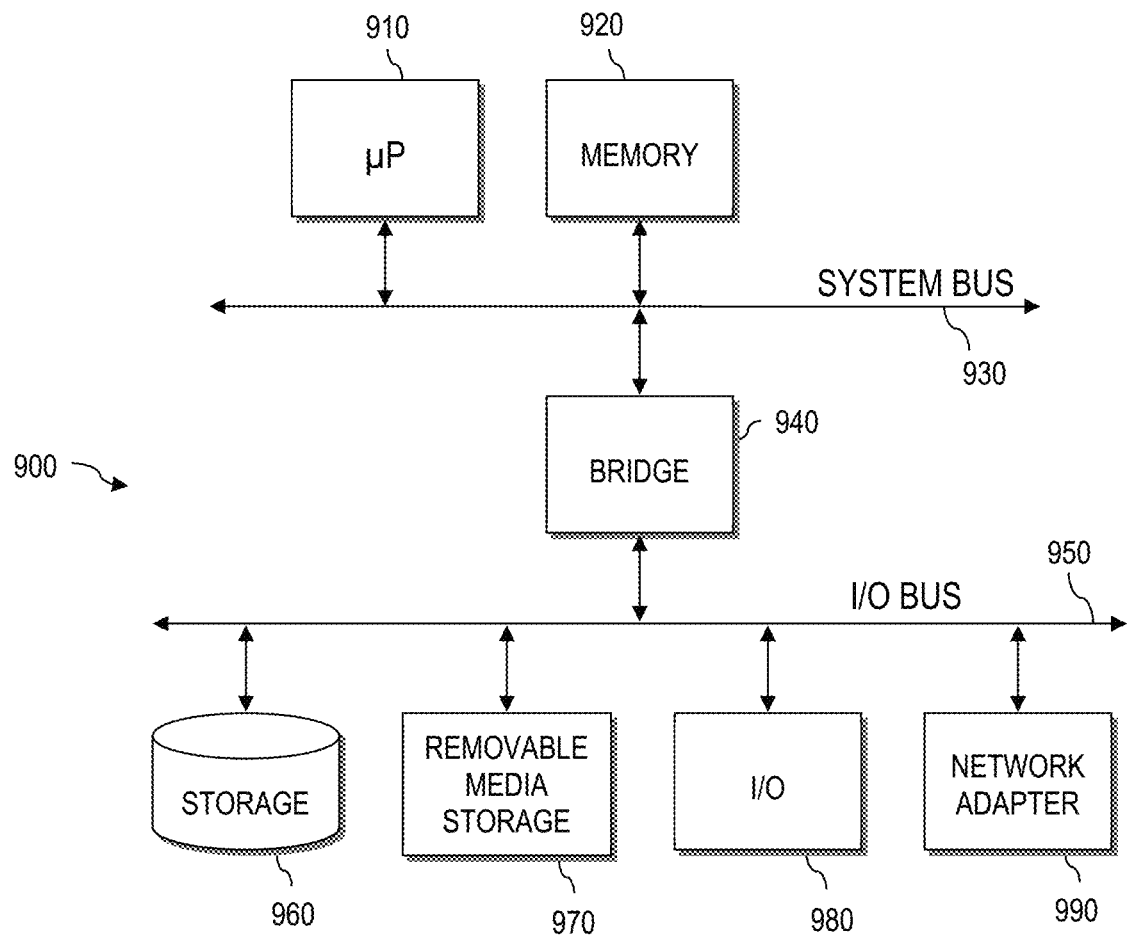
FIG. 9 is a block diagram of a computer system having a computer readable storage medium for implementing functions according to various aspects of the present disclosure.

In embodiments where the adjustment is not performed automatically (e.g., a service technician makes the adjustment), an indication that the adjustment has been made is sent to the processor. That indication may be supplied by the technician, automatically using sensors on the distance and range measurement device, using a timer to assume that the adjustment has been made, etc., or combinations thereof Miscellaneous FIG. 9 is a block diagram of a data processing system is depicted in accordance with the present invention. Data processing system 900 may comprise a symmetric multiprocessor (SMP) system or other configuration including a plurality of processors 910 connected to system bus 930. Alternatively, a single processor 910 may be employed. Also connected to system bus 930 is local memory 920. An I/O bus bridge 940 is connected to the system bus 930 and provides an interface to an I/O bus 950. The I/O bus may be utilized to support one or more buses and corresponding devices such as storage 960, removable media storage 970, input output devices (I/O devices) 980, network adapters 990, etc. Network adapters may also be coupled to the system to enable the data processing system to become coupled to other data processing systems or remote printers or storage devices through intervening private or public networks.

Also connected to the I/O bus may be devices such as a graphics adapter, storage and a computer usable storage medium having computer usable program code embodied thereon. The computer usable program code may be executed to implement any aspect of the present invention, for example, to implement any aspect of any of the methods and/or system components illustrated in the figures above.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. A computer storage medium does not include propagating signals.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Network using an Network Service Provider).

Aspects of the present disclosure are described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the invention in the form disclosed. Many modifications and variations will be apparent to those of ordinary skill in the art without departing from the scope and spirit of the invention. Aspects of the disclosure were chosen and described in order to best explain the principles of the invention and the practical application, and to enable others of ordinary skill in the art to understand the invention for various embodiments with various modifications as are suited to the particular use contemplated.

What is claimed is:

1. A process for calibrating a distance and range measurement device coupled to an industrial vehicle, the process comprising:
   taking a first measurement of an emission from the distance and range measurement device at a first yaw angle relative to a roll axis of the distance and range measurement device;
   taking a second measurement of the emission from the distance and range measurement device at a second yaw angle relative to the roll axis;
   determining, using a processor, that a roll angle of the distance and range measurement device is correct when a difference between the first measurement and the second measurement is within a roll tolerance;
   determining that the roll angle of the distance and range measurement device is incorrect when a difference between the first measurement and the second measurement is not within the roll tolerance;
   determining an adjustment direction based on the first measurement and the second measurement;
   displaying, on a display device of the industrial vehicle, an indication of the adjustment direction;
   receiving an indication that an adjustment of the distance and range measurement device has been made;
   taking a new first measurement of the emission from the distance and range measurement device at a new first yaw angle relative to the roll axis of the distance and range measurement device;
   taking a new second measurement of the emission from the distance and range measurement device at a new second yaw angle relative to the roll axis; and
   determining, using the processor, that the roll angle of the distance and range measurement device is correct when a difference between the new first measurement and the new second measurement is within the roll tolerance.

2. A process for calibrating a distance and range measurement device coupled to an industrial vehicle, the process comprising:
   taking a first measurement of an emission from the distance and range measurement device at a first yaw angle relative to a roll axis of the distance and range measurement device;
   taking a second measurement of the emission from the distance and range measurement device at a second yaw angle relative to the roll axis;
   determining, using a processor, that a roll angle of the distance and range measurement device is correct when a difference between the first measurement and the second measurement is within a roll tolerance;
   determining that the roll angle of the distance and range measurement device is incorrect when a difference between the first measurement and the second measurement is not within the roll tolerance;
   determining an adjustment direction based on the first measurement and the second measurement;
   determining an adjustment magnitude based on the first measurement and the second measurement; and
   adjusting, using motors, the distance and range measurement device relative to the roll axis in the adjustment direction by an amount of the adjustment magnitude.

3. The process of claim 1, wherein:
   the new first yaw angle is within an angular tolerance of the first yaw angle; and
   the new second yaw angle is within an angular tolerance of the second yaw angle.

4. The process of claim 1, wherein:
   the new first yaw angle is not within an angular tolerance of the first yaw angle; and
   the new second yaw angle is not within an angular tolerance of the second yaw angle.

5. The process of claim 1, wherein:
   determining, using a processor, that a roll angle of the distance and range measurement device is correct when a difference between the first measurement and the second measurement is within a roll tolerance comprises determining, using a processor on the industrial vehicle, that the roll angle of the distance and range measurement device is correct when the difference between the first measurement and the second measurement is within the roll tolerance.

6. The process of claim 1, wherein:
   determining, using a processor, that a roll angle of the distance and range measurement device is correct when a difference between the first measurement and the second measurement is within a roll tolerance comprises determining, using a processor separate from the industrial vehicle, that the roll angle of the distance and range measurement device is correct when the difference between the first measurement and the second measurement is within the roll tolerance.

7. The process of claim 1 further comprising:
   storing an indication of correct calibration after the roll angle of the distance and range measurement device is determined to be correct.

8. The process of claim 1, wherein taking a first measurement of an emission from the distance and range measurement device at a first yaw angle relative to a roll axis of the distance and range measurement device comprises taking a first measurement of a laser beam emitted from a laser at the first yaw angle relative to the roll axis of the distance and range measurement device.

9. The process of claim 1, wherein taking a second measurement of the emission from the distance and range measurement device at a second yaw angle relative to the roll axis comprises taking the second measurement of the emission from the distance and range measurement device at the second yaw angle relative to the roll axis, wherein the second yaw angle is within an angular tolerance of the first yaw angle but in an opposite direction of the first yaw angle from the roll axis.

10. The process of claim 1, wherein taking a second measurement of the emission from the distance and range measurement device at a second yaw angle relative to the roll axis comprises:
   taking the second measurement of the emission from the distance and range measurement device at the second yaw angle relative to the roll axis wherein the second yaw angle is different than the first yaw angle.

11. The process of claim 10 further comprising:
   scaling the first measurement based on the first yaw angle and the second yaw angle to create a scaled first measurement;
   wherein determining, using a processor, that a roll angle of the distance and range measurement device is correct when a difference between the first measurement and the second measurement is within a roll tolerance comprises determining, using a processor, that the roll angle of the distance and range measurement device is correct when the difference between the scaled first measurement and the second measurement is within the roll tolerance.

12. The process of claim 10 further comprising:
   scaling the second measurement based on the first yaw angle and the second yaw angle to create a scaled second measurement;
   wherein determining, using a processor, that a roll angle of the distance and range measurement device is correct when the first measurement and the second measurement are within a roll tolerance comprises determining, using a processor, that the roll angle of the distance and range measurement device is correct when the difference between the first measurement and the scaled second measurement is within the roll tolerance.

13. A process for calibrating a distance and range measurement device coupled to an industrial vehicle, the process comprising:
   determining a virtual emission length based on a length of a scan field, a height that the scan field is above a floor, and an angle of the distance and range measurement device with respect to a pitch axis of the distance and range measurement device;
   taking a measurement of an emission from the distance and range measurement device at a pitch angle with respect to the pitch axis of the distance and range measurement device; and
   determining, using a processor, that the pitch angle of the distance and range measurement device is correct when a difference between the measurement and the virtual emission length is within a pitch tolerance.

14. The process of claim 13 further comprising:
   determining that the pitch angle of the distance and range measurement device is incorrect when a difference between the measurement and the virtual emission length is not within the pitch tolerance; and
   determining an adjustment direction based on the measurement and the virtual emission length.

15. The process of claim 14 further comprising:
   determining an adjustment magnitude based on the measurement and the virtual emission length; and
   adjusting, using motors, the distance and range measurement device relative to the pitch axis in the adjustment direction by an amount of the adjustment magnitude.

16. The process of claim 14 further comprising:
   displaying, on a display device of the industrial vehicle, an indication of the adjustment direction;
   receiving an adjustment of the distance and range measurement device;
   taking a new measurement of the emission from the distance and range measurement device at a new angle relative to the pitch axis of the distance and range measurement device; and
   determining, using the processor, that the pitch angle of the distance and range measurement device is correct when the new measurement is within the pitch tolerance of the virtual emission length.

17. The process of claim 13 further comprising:
   storing an indication of correct calibration after the pitch angle of the distance and range measurement device is determined to be correct.

* * * * *